US009484826B2

(12) United States Patent
Lin et al.

(10) Patent No.: US 9,484,826 B2
(45) Date of Patent: Nov. 1, 2016

(54) MULTIPORT DC-DC AUTOTRANSFORMER AND METHODS FOR CONTROLLING AND USING THE SAME

(71) Applicant: Huazhong University of Science and Technology, Wuhan (CN)

(72) Inventors: Weixing Lin, Wuhan (CN); Jinyu Wen, Wuhan (CN); Shijie Cheng, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 14/710,622

(22) Filed: May 13, 2015

(65) Prior Publication Data
US 2015/0280594 A1 Oct. 1, 2015

Related U.S. Application Data

(63) Continuation-in-part of application No. PCT/CN2014/075482, filed on Apr. 16, 2014.

(30) Foreign Application Priority Data

Mar. 25, 2014 (CN) .......................... 2014 1 0112621

(51) Int. Cl.
*H02M 3/335* (2006.01)
*H02M 3/28* (2006.01)
(Continued)

(52) U.S. Cl.
CPC ........... *H02M 3/33546* (2013.01); *H02M 3/28* (2013.01); *H02J 1/08* (2013.01);
(Continued)

(58) Field of Classification Search
CPC .............. H02M 2001/0074; H02M 2001/009; H02M 2001/0093; H02M 3/33546; H02M 7/4807; H02M 7/49
See application file for complete search history.

(56) References Cited

U.S. PATENT DOCUMENTS 4,847,745 A * 7/1989 Shekhawat ......... H02M 7/5387
363/132
5,532,575 A * 7/1996 Ainsworth ............ H02J 3/1857
323/211
(Continued)

FOREIGN PATENT DOCUMENTS

CN 102292893 A 12/2011
CN 102427243 A 4/2012
(Continued)

OTHER PUBLICATIONS

G.F. Tang et al., Multi-terminal HVDC and DC-grid technology, Proceedings of the CSEE, Apr. 2013, pp. 8-17, vol. 33, No. 10, China Electric Power Research Institute, China.
(Continued)

*Primary Examiner* — Fred E Finch, III
(74) *Attorney, Agent, or Firm* — Hamre, Schumann, Mueller & Larson, P.C.

(57) ABSTRACT

A multiport DC-DC autotransformer for interconnecting three or more DC systems. The autotransformer includes 2N−1 converters sequentially connected in series at a DC side, and connected to an AC transmission line via an AC link at an AC side, and a positive terminal of the $i^{th}$ converter of the 2N−1 sequentially connected converters and a negative terminal of the $(2N-i)^{th}$ converter are respectively connected to a positive terminal of the $i^{th}$ DC system and a negative terminal thereof, where N represents the number of DC systems, and i represents the serial number of converters. Also disclosed are a method for determining power rating of each converter of the multiport DC-DC autotransformer, and a method for controlling the autotransformer. Most power can be transferred between different DC systems via a direct electrical connection without DC-AC-DC conversion.

17 Claims, 14 Drawing Sheets

(51) Int. Cl.
*H02M 7/49* (2007.01)
*H02M 1/00* (2006.01)
*H02M 7/25* (2006.01)
*H02J 1/08* (2006.01)
*H02J 1/00* (2006.01)

(52) U.S. Cl.
CPC .......... *H02J 2001/002* (2013.01); *H02M 7/25* (2013.01); *H02M 7/49* (2013.01); *H02M 2001/009* (2013.01); *H02M 2001/0077* (2013.01); *H02M 2001/0093* (2013.01)

(56) References Cited

U.S. PATENT DOCUMENTS

| | | | | |
|---|---|---|---|---|
| 6,278,626 | B1* | 8/2001 | Teichmann | H02M 7/4826 363/135 |
| 2004/0233685 | A1* | 11/2004 | Matsuo | H02M 3/285 363/65 |
| 2009/0196764 | A1* | 8/2009 | Fogarty | F04D 25/0606 417/44.1 |
| 2012/0113695 | A1* | 5/2012 | Chivite Zabalza | H02M 7/49 363/71 |
| 2013/0088906 | A1* | 4/2013 | Jiang-Hafner | H02M 7/483 363/131 |
| 2013/0201727 | A1* | 8/2013 | Kolar | H02J 3/01 363/17 |
| 2014/0177293 | A1* | 6/2014 | Eckhardt | H02M 1/12 363/37 |
| 2014/0375122 | A1* | 12/2014 | Papastergiou | H02J 1/102 307/18 |
| 2015/0145252 | A1* | 5/2015 | Lin | F03D 9/005 290/44 |
| 2015/0303819 | A1* | 10/2015 | Qu | H02M 5/44 363/35 |

FOREIGN PATENT DOCUMENTS

| | | |
|---|---|---|
| CN | 103117666 A | 5/2013 |
| CN | 103208929 A | 7/2013 |
| CN | 103219910 A | 7/2013 |

OTHER PUBLICATIONS

S. Falcones et al., A DC-DC multiport-converter-based solid-state transformer integrating distributed generation and storage, IEEE Transactions on Power Electronics, May 2013, pp. 2192-2203, vol. 28, No. 5, IEEE Power Electronics Society, United States.

* cited by examiner

MULTIPORT DC-DC AUTOTRANSFORMER AND METHODS FOR CONTROLLING AND USING THE SAME

CROSS-REFERENCE TO RELATED APPLICATIONS

This application is a continuation-in-part of International Patent Application No. PCT/CN2014/075482 with an international filing date of Apr. 16, 2014, designating the United States, now pending, and further claims priority benefits to Chinese Patent Application No. 201410112621.9 filed Mar. 25, 2014. The contents of all of the aforementioned applications, including any intervening amendments thereto, are incorporated herein by reference.

BACKGROUND OF THE INVENTION

1. Field of the Invention

The invention relates to a DC-DC converter adapted to interconnecting different DC systems with different voltage levels.

2. Description of the Related Art

A conventional method for interconnecting multiple DC systems with different voltage levels is to connect each two DC systems via a two-port DC-DC converter. However, this method requires a large number of two-port DC-DC converters, and features high cost and great power loss. Another method is to use a multiport DC-DC converter.

Typically, the multiport DC-DC converter employs an inductor-capacitor-inductor (LCL) circuit, or employs a multiport high-frequency transformer. A remarkable feature of the multiport DC-DC converters employing either the LCL circuit or the multiport high-frequency transformer is that there is no direct connection between DC sides of interconnected DC systems. As such, it is impossible for the multiport DC-DC converter to fully utilize existing DC voltage of all DC systems, power can only be transferred only after DC-AC-DC conversion, and overall power rating of the converter is twice an interconnected power rating, which increases cost of the converters and an AC link, and causes great power loss.

Although there is a stereoscopic DC-DC converter fully utilizing existing DC voltage of low-voltage DC systems by connecting three converters in series, the scheme can only connect two DC systems with different voltage level, while cannot connect three or more DC systems with different voltage levels, and does not tell how to determine rated voltage and rated power of each converter in the stereoscopic DC-DC converter containing more than three converters.

SUMMARY OF THE INVENTION

In view of the above-described problems, it is one objective of the invention to provide a multiport DC-DC autotransformer capable of making full use of existing DC voltage of all DC systems and directly and electrically connecting the DC systems so that most of the power therebetween is transferred via direct electrical connection without DC-AC-DC conversion, so as to address problems with the above-mentioned conventional multiport DC-DC converter, and to reduce overall power rating of the converters in a multiport DC-DC converter, thereby saving costs and operation loss.

To achieve the above objective, in accordance with one embodiment of the invention, there is provided a multiport DC-DC autotransformer for interconnecting N DC systems (N≥3), the autotransformer comprising 2N−1 converters sequentially connected in series at a DC side, and connected in parallel to one point at an AC side, where a negative terminal of the first converter is connected to a positive terminal of the second converter, a negative terminal of the second converter is connected to a positive terminal of the third converter, . . . , a positive terminal of the $j^{th}$ converter is connected to a negative terminal of the $(j−1)^{th}$ converter, a negative terminal of the $j^{th}$ converter is connected to a positive terminal of the $(j+1)^{th}$ converter, and a positive terminal of the $(2N−1)^{th}$ converter is connected to a negative terminal of the $(2N−2)^{th}$ converter, j is a positive integer between 2 and 2N−2.

After DC sides of all converters are connected in series, a positive terminal of the first converter and a negative terminal of the $(2N−1)^{th}$ converter are respectively connected to a positive terminal and a negative terminal of the first DC system, the positive terminal of the second converter and a negative terminal of the $(2N−2)^{th}$ converter are respectively connected to a positive terminal and a negative terminal of the second DC system, . . . , a positive terminal of the $i^{th}$ converter and a negative terminal of the $(2N−i)^{th}$ converter are respectively connected to a positive terminal and a negative terminal of the $i^{th}$ DC system, and a positive terminal and a negative terminal of the $N^{th}$ converter are respectively connected to a positive terminal and a negative terminal of the $N^{th}$ DC system.

After the DC sides of all converters are connected to corresponding DC systems, the AC sides of all converters are connected to a common point being a common AC bus via an AC link.

In a class of the embodiment, as the AC link employs an AC transformer, ports of AC transformers of converters from the first to the $(N−1)^{th}$ and those from the $(N+1)^{th}$ to the $(2N−1)^{th}$ in the vicinity of the DC side employ delta connection thereby eliminating neutral unbalance of the converters, and ports of transformers of the $N^{th}$ converter in the vicinity of the DC side and ports of all converters in the vicinity of the common AC bus may employ star connection or delta connection.

In a class of the embodiment, ports of AC transformers of converters from the first to the $(N−1)^{th}$ and those from the $(N+1)^{th}$ to the $(2N−1)^{th}$ in the vicinity of the common AC bus employ delta connection thereby eliminating neutral unbalance of the converters, and ports of transformers of the $N^{th}$ converter in the vicinity of the common AC bus and ports of all 2N−1 converters in the vicinity of the DC side may employ star connection or delta connection.

In a class of the embodiment, at least one converter of the 2N−1 converters operates to control an AC voltage of the common AC bus, and the remaining converters operate to control respective active power, thereby facilitating stable operation of the multiport DC-DC autotransformer.

In a class of the embodiment, converters from the first to the $(N−1)^{th}$ and those from the $(N+1)^{th}$ to the $(2N−1)^{th}$ are connected to the AC bus via phase reactors, and each phase of the phase reactors employ delta connection thereby eliminating neutral unbalance of the converters.

In a class of the embodiment, any one of DC systems from the first to the $N^{th}$ is formed by one or more AC systems that are interconnected at the DC side after AC-DC conversion.

In a class of the embodiment, any one of DC systems from the first to the $N^{th}$ is formed by one or more AC systems that are connected to DC systems outputting DC power at the DC side after AC-DC conversion.

In a class of the embodiment, the common AC bus may be connected to an external AC grid.

In a class of the embodiment, AC sides of converters from the first to the $(2N-1)^{th}$ are not connected to the common AC bus, but to the same AC grid or different AC grids.

In a class of the embodiment, as the common AC bus is not connected to the external AC grid, a rated DC voltage of each of the first converter and the $(2N-1)^{th}$ converter is designed to $(E_1-E_2)/2$, a rated DC voltage of each of the second converter and the $(2N-2)^{th}$ converter is designed to $(E_2-E_3)/2, \ldots$, a rated DC voltage of each of the $i^{th}$ converter and the $(2N-i)^{th}$ converter is designed to $(E_i-E_{i+1})/2$, a rated DC voltage of the $N^{th}$ converter is designed to $E_N$. Values of the above-mentioned rated DC voltages are reference values, and rated DC voltages can be appropriately increased or decreased based on these reference values thereby enabling the multiport DC-DC autotransformer to operate. $E_1$ to $E_N$ respectively represents a rated DC voltage of the first DC system to the $N^{th}$ DC system, $E_1 > E_2 > \ldots > E_N$, and the rated DC voltage is a rated voltage of a high-voltage DC terminal with respect to a low-voltage DC terminal.

In a class of the embodiment, any one of the DC systems from the first to the $N^{th}$ may employ symmetrical bipolar topology, symmetrical monopole topology, asymmetrical monopole topology or asymmetrical bipolar topology.

In a class of the embodiment, the converters from the first to the $(2N-1)^{th}$ are voltage source converters to enable bidirectional power exchange between any one of the DC systems from the first to the $N^{th}$ and the multiport DC-DC autotransformer.

In a class of the embodiment, any one of the converters from the first to the $(2N-1)^{th}$ may employ a thyristor based line commutated converter, or an un-controlled rectifying bridge.

A method for determining power rating of each converter of the multiport DC-DC autotransformer, the method comprising: respectively obtaining power $P_2$-$P_N$ output to the multiport DC-DC autotransformer by DC systems from the second to the $N^{th}$ DC system, and active power absorbed by the first DC system $(P_2+\ldots+P_N)$, respectively calculating DC currents $P_2/E_2$ to $P_N/E_N$ output by the DC systems from the second to the $N^{th}$ DC system, and an input current of the first DC system $(P_2+\ldots+P_N)/E_1$, and obtaining a DC current exported by the first converter according to the Kirchhoff's current law and the topology of the multiport DC-DC autotransformer:

$$i_{VSC1} = \frac{P_2 + \ldots + P_N}{E_1} \quad (1)$$

a DC current exported by the second converter:

$$i_{VSC2} = \frac{P_2 + \ldots + P_N}{E_1} - \frac{P_2}{E_2} \quad (2)$$

a DC current exported by the third converter:

$$i_{VSC3} = \frac{P_2 + \ldots + P_N}{E_1} - \frac{P_2}{E_2} - \frac{P_3}{E_3} \quad (3)$$

a DC current exported by the $i^{th}$ converter:

$$i_{VSCi} = \frac{P_2 + \ldots + P_N}{E_1} - \frac{P_2}{E_2} - \frac{P_3}{E_3} - \ldots - \frac{P_i}{E_i} \quad (4)$$

a DC current exported by the $N^{th}$ converter:

$$i_{VSCN} = \frac{P_2 + \ldots + P_N}{E_1} - \frac{P_2}{E_2} - \frac{P_3}{E_3} - \ldots - \frac{P_N}{E_N} \quad (5)$$

then calculating power rectified by the first converter based on power conservation:

$$P_{VSC1} = \frac{P_2 + \ldots + P_N}{E_1} * \frac{E_1 - E_2}{2} \quad (6)$$

power rectified by the second converter:

$$P_{VSC2} = \left(\frac{P_2 + \ldots + P_N}{E_1} - \frac{P_2}{E_2}\right) * \frac{E_2 - E_3}{2} \quad (7)$$

power rectified by the third converter:

$$P_{VSC3} = \left(\frac{P_2 + \ldots + P_N}{E_1} - \frac{P_2}{E_2} - \frac{P_3}{E_3}\right) * \frac{E_3 - E_4}{2} \quad (8)$$

power rectified by the $i^{th}$ converter:

$$P_{VSCi} = \left(\frac{P_2 + \ldots + P_N}{E_1} - \frac{P_2}{E_2} - \ldots - \frac{P_i}{E_i}\right) * \frac{E_i - E_{i+1}}{2} \quad (9)$$

power rectified by the $N^{th}$ converter:

$$P_{VSCN} = \left(\frac{P_2 + \ldots + P_N}{E_1} - \frac{P_2}{E_2} - \ldots - \frac{P_N}{E_N}\right) * E_N \quad (10)$$

The above equations (6)-(10) need to satisfy the following conditions:

$$-P_{2max} = P_2 \leq P_{2max}$$
$$\ldots$$
$$-P_{Nmax} \leq P_N \leq P_{Nmax} \quad (11)$$
$$-P_{1max} \leq (P_2+P_3+\ldots+P_N) \leq P_{1max} \quad (12)$$

In equations (11) to (12), $P_{1max}$ to $P_{Nmax}$ respectively represents maximum output/input power of the DC systems from the first to the $N^{th}$. Substituting equation (6) with equations (11) and (12), maximum power of the first converter is:

$$P_{VSC1,max} = \frac{P_{1max}}{E_1} * \frac{E_1 - E_2}{2} \quad (13)$$

A maximum active power of each of the converters from the second to the $N^{th}$ cannot be expressed by a generic equation. Maximum power of each converter as rated power thereof is obtained according to $P_{1max}$ to $P_{Nmax}$, and $E_1$ to $E_N$ based on equations (11) and (12), where the rated power of the $(2N-1)^{th}$ converter is equal to that of the first converter, the rated power of the $(2N-2)^{th}$ converter is equal to that of the second converter, . . . , and the rated power of the $(2N-i)^{th}$ converter is equal to that of the $i^{th}$ converter. Values of the above-mentioned rated power are reference values, and the rated power can be appropriately increased or decreased based on these reference values thereby enabling the multiport DC-DC autotransformer to operate.

A method for controlling the multiport DC-DC autotransformer, at least one converter operates to control an AC voltage of the common AC bus, and the other converters operate to control parameters related to active power, such as a DC power or a DC voltage.

Particularly, depending on power rating of the multiport DC-DC autotransformer, an AC link therein may employ a single-phase AC circuit, a two-phase AC circuit, a three-phase AC circuit, or a multi-phase AC circuit.

In summary, the present invention has the following advantages over the prior art:

1) by connecting the DC systems having different voltage level in series, the present invention makes full use of the DC voltages already existed in the DC systems, and significantly reduces the rated DC voltages of all converters, and thus cost.

2) the overall power rating of all converters is far less than that of a conventional multiport DC-DC converter, which significantly reduces cost of the converter.

3) most interchanged power of the DC systems is transferred via direct electric connection therebetween, which significantly reduces power that is subjected to two-stage DC-AC-DC conversion, operation loss and thus operation cost, while for a conventional multiport DC-DC converter, all interchanged power needs two-stage DC-AC-DC conversion, which features high operation loss.

4) as for the DC systems of the present invention, only part of interchanged power needs two-stage DC-AC-DC conversion, which significantly reduces cost of the AC link, while for the conventional multiport DC-DC converter, all interchanged power needs two-stage DC-AC-DC conversion, and power rating of the AC link is twice of the interchanged power.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

The multiport DC-DC autotransformer of the present invention operates to interconnect three or more DC systems with different rated DC voltages, and is capable of solving problems of high cost and great power loss with a conventional multiport DC-DC converter employing full-power DC-AC-DC conversion.

Figure 1:
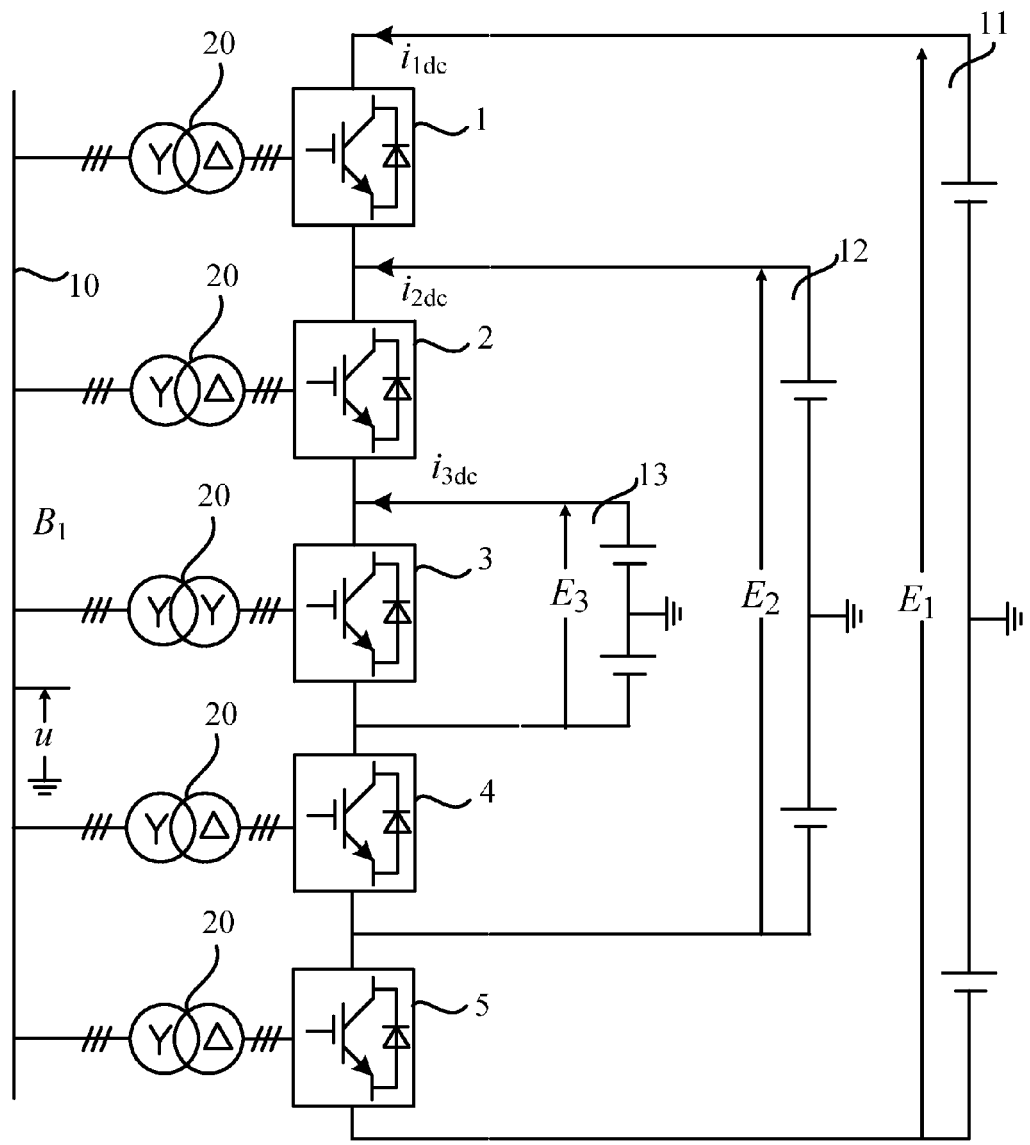
FIG. 1 is a schematic diagram of a three-port DC-DC autotransformer of an exemplary embodiment of the invention.

FIG. 1 illustrates a three-port DC-DC autotransformer (N=3), and comprises five converters sequentially connected in series at a DC side (2N−1=5). A negative terminal of the first converter 1 is connected to a positive terminal of the second converter 2, a negative terminal of the second converter 2 is connected to a positive terminal of the third converter 3, a negative terminal of the third converter 3 is connected to a positive terminal of the fourth converter 4, a negative terminal of the fourth converter 4 is connected to a positive terminal of the fifth converter 5, a positive terminal of the first converter and a negative terminal of the fifth converter are respectively connected to a positive terminal of the first DC system and a negative terminal thereof, a positive terminal of the second converter and a negative terminal of the fourth converter are respectively connected to a positive terminal of the second DC system and a negative terminal thereof, and a positive terminal of the third converter and a negative terminal thereof are respectively connected to a positive terminal of the third DC system and a negative terminal thereof. After DC sides of all converters are connected in series, AC sides of the first converter 1 to the fifth converter 5 are connected to a common AC bus 10 via AC links 20 (such as AC transformers, phase reactors, inductor-capacitor-inductor circuits and so on). In this embodiment, the converter is preferably a voltage source converter that is well known in the art, so that bidirectional power transmission can be enabled between each DC system and the multiport DC-DC autotransformer.

Figure 2:
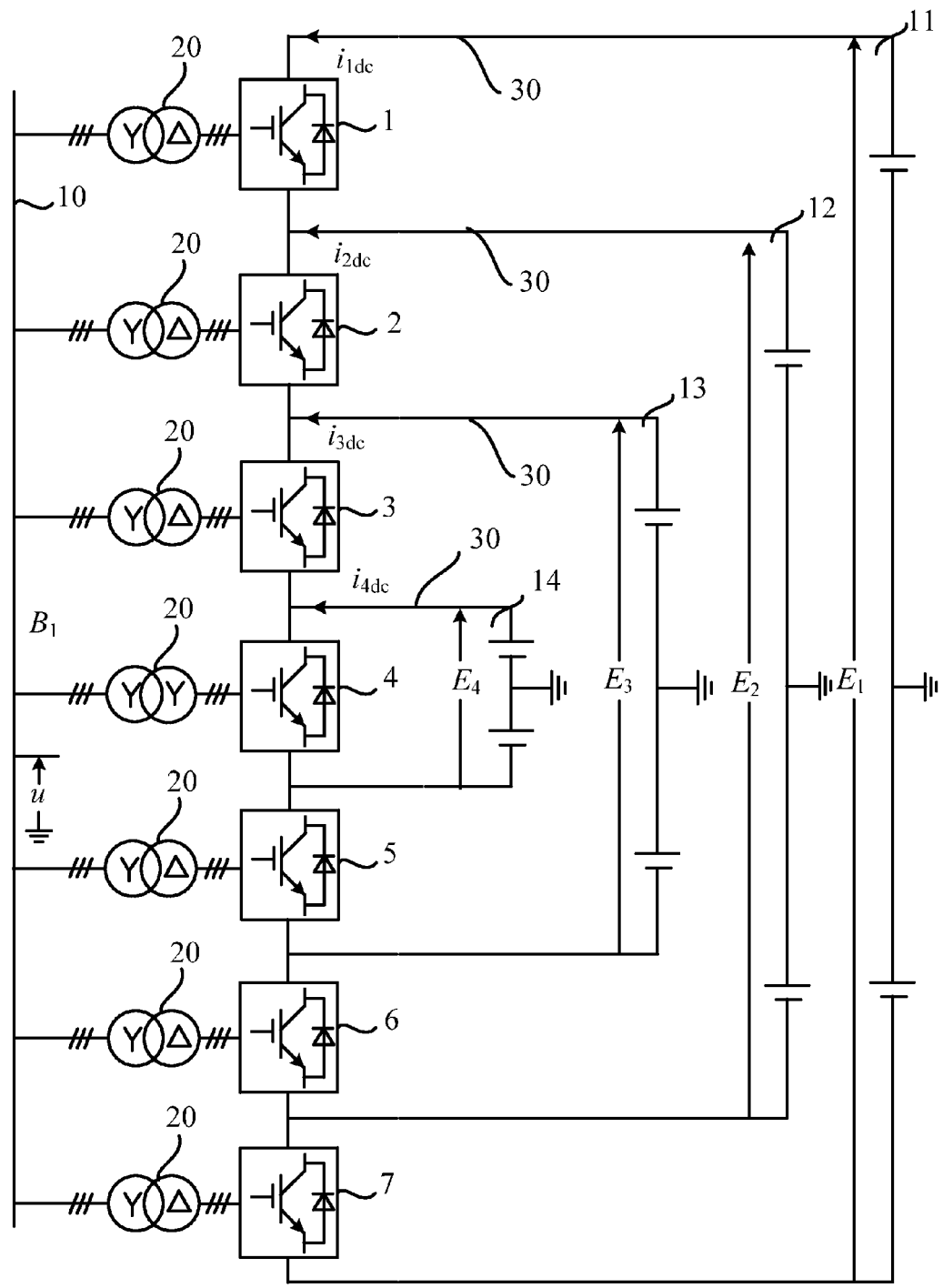
FIG. 2 is a schematic diagram of a four-port DC-DC autotransformer of another exemplary embodiment of the invention.

FIG. 2 illustrates a four-port DC-DC autotransformer (N=4), and comprises seven converters sequentially connected in series at a DC side (2N−1=7). A negative terminal of the first converter 1 is connected to a positive terminal of the second converter 2, a negative terminal of the second converter 2 is connected to a positive terminal of the third converter 3, a negative terminal of the third converter 3 is connected to a positive terminal of the fourth converter 4, a negative terminal of the fourth converter 4 is connected to a positive terminal of the fifth converter 5, a negative terminal of the fifth converter 5 is connected to a positive terminal of the sixth converter 6, and a negative terminal of the sixth converter 6 is connected to a positive terminal of the seventh converter 7. A positive terminal of the first converter and a negative terminal of the seventh converter are respectively connected to a positive terminal of the first DC system and a negative terminal thereof, a positive terminal of the second converter and a negative terminal of the sixth converter are respectively connected to a positive terminal of the second DC system and a negative terminal thereof, a positive terminal of the third converter and a negative terminal of the fifth converter are respectively connected to a positive terminal of the third DC system and a negative terminal thereof, and a positive terminal of the fourth converter and a negative terminal thereof are respectively connected to a positive terminal of the fourth DC system and a negative terminal thereof. After DC sides of all converters are connected in series, AC sides of the first converter 1 to the seventh converter 7 are connected to a common AC bus 10 via AC links 20 (such as AC transformers, phase reactors and so on).

In FIG. 2, to eliminate neutral unbalance of the first converter 1 to the third converter 3, and the fifth converter 5 to the seventh converter 7, transformers connected thereto in the vicinity of the DC side may employ delta connection.

Figure 3:
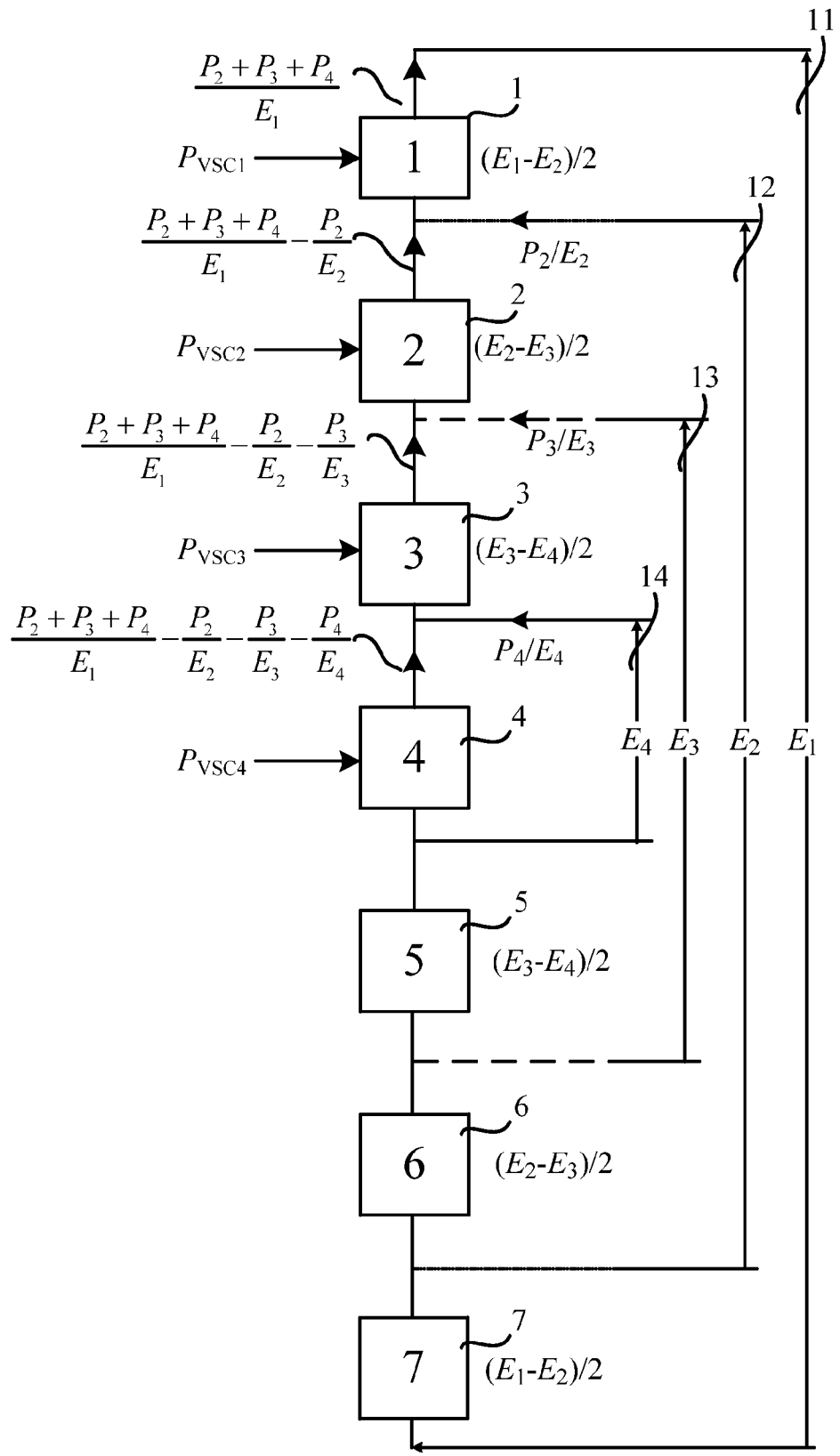
FIG. 3 illustrates a method for determining power rating for each converter of the four-port DC-DC autotransformer.

FIG. 3 illustrates power flow analysis of the four-port DC-DC autotransformer in FIG. 2. To simplify drawing, converters from the first converter 1 to the seventh converter 7 are labeled with numbers in blocks. It can be seen from FIGS. 2 and 3 that a rated voltage of each of the first converter 1 and the seventh converter 7 is $(E_1-E_2)/2$. A rated voltage of each of the second converter 2 and the sixth converter 6 is $(E_2-E_3)/2$, a rated DC voltage of each of the third converter 3 and the fifth converter 5 is $(E_3-E_4)/2$, and a rated DC voltage of the fourth converter 4 is $E_4$. It should be noted that values of the above-mentioned rated DC voltages are designed as reference values of the converters only, and can be appropriately increased or decreased thereby still enabling the multiport DC-DC autotransformer to operate.

Denote DC power outputting from the fourth DC system 14, the third DC system 13 and the second DC system 12 in FIG. 3 are respectively $P_4$, $P_3$ and $P_2$, according to the power balance principle, a DC power input to a first DC system 11 is $(P_4+P_3+P_2)$. DC currents output from the fourth DC system 14 to the second DC system 12 are respectively $P_4/E_4$, $P_3/E_3$ and $P_2/E_2$, and DC current input to the first DC system 11 is $(P_4+P_3+P_2)/E_1$. According to the Kirchhoff's current law, DC currents output via the first converter 1 to the fourth converter 4 are respectively:

$$i_{VSC1} = \frac{P_4+P_3+P_2}{E_1} \tag{31}$$

$$i_{VSC2} = \frac{P_4+P_3+P_2}{E_1} - \frac{P_2}{E_2} \tag{32}$$

$$i_{VSC3} = \frac{P_4+P_3+P_2}{E_1} - \frac{P_2}{E_2} - \frac{P_3}{E_3} \tag{33}$$

$$i_{VSC4} = \frac{P_4+P_3+P_2}{E_1} - \frac{P_2}{E_2} - \frac{P_3}{E_3} - \frac{P_4}{E_4} \tag{34}$$

Then rectifying power of the first converter 1 to the fourth converter 4 is respectively:

$$P_{VSC1} = i_{VSC1}\frac{E_1-E_2}{2} = \frac{E_1-E_2}{2E_1}(P_4+P_3+P_2) \tag{35}$$

$$\begin{aligned}P_{VSC2} &= \frac{E_2-E_3}{2}i_{VSC2} \\ &= \frac{E_2-E_3}{2}\left(\frac{P_4+P_3+P_2}{E_1}-\frac{P_2}{E_2}\right) \\ &= \frac{E_2-E_3}{2E_1}P_4 + \frac{E_2-E_3}{2E_1}P_3 - \left(\frac{E_2-E_3}{2E_2}-\frac{E_2-E_3}{2E_1}\right)P_2\end{aligned} \tag{36}$$

$$\begin{aligned}P_{VSC3} &= \frac{E_3-E_4}{2}i_{VSC3} \\ &= \frac{E_3-E_4}{2}\left(\frac{P_4+P_3+P_2}{E_1}-\frac{P_2}{E_2}-\frac{P_3}{E_3}\right) \\ &= \frac{E_3-E_4}{2E_1}P_4 - \left(\frac{E_3-E_4}{2E_2}-\frac{E_3-E_4}{2E_1}\right)P_3 - \\ &\quad \left(\frac{E_3-E_4}{2E_3}-\frac{E_3-E_4}{2E_1}\right)P_2\end{aligned} \tag{37}$$

$$\begin{aligned}-P_{VSC4} &= -E_4 i_{VSC4} \\ &= -E_4\left(\frac{P_4+P_3+P_2}{E_1}-\frac{P_2}{E_2}-\frac{P_3}{E_3}-\frac{P_4}{E_4}\right) \\ &= \left(1-\frac{E_4}{E_1}\right)P_4 + \left(\frac{E_4}{E_3}-\frac{E_4}{E_1}\right)P_3 + \left(\frac{E_4}{E_2}-\frac{E_4}{E_1}\right)P_2\end{aligned} \tag{38}$$

Equations (35) to (38) need to satisfy the following conditions:

$-P_{4max} \leq P_4 \leq P_{4max}$ $-P_{3max} \leq P_3 \leq P_{3max}$ $-P_{2max} \leq P_2 \leq P_{2max}$ \hfill (39)

$-P_{1max} \leq (P_4+P_3+P_2) \leq P_{1max}$ \hfill (40)

In equations (39) and (40), $P_{4max}$ to $P_{1max}$ respectively represents maximum output/input DC power of the fourth DC system 14 to the first DC system 11, namely an absolute value of a rated output/input DC power of the fourth DC system 14 to the first DC system 11.

For example, in an embodiment, rated DC voltages of the fourth DC system 14 to the first DC system 11 are respectively ±250 kV, ±320 kV, ±400 kV and ±500 kV, namely values of $E_4$ to $E_1$ are respectively 500, 640, 800 and 1000, by substituting equations (35) to (38) with $E_4$ to $E_1$:

$P_{VSC1}=0.1*(P_4+P_3+P_1)$ \hfill (41)

$P_{VSC2}=0.008(P_4+P_3)-0.02P_2$ \hfill (42)

$P_{VSC3}=0.07P_4-0.039375P_3-0.0175P_2$ \hfill (43)

$-P_{VSC4}=0.5P_4+0.28125P_3+0.125P_2$ \hfill (44)

In another embodiment (rated DC voltages and rated DC power of all DC systems are listed in the following Table 1), $P_{4max}$=700 MW, $P_{3max}$=1000 MW, $P_{2max}$=1300 MW, $P_{1max}=2000$ MW. By substituting equations (41) to (44) with these values and taking equations (39) and (40) into account, at $P_4+P_3+P_2=P_{1max}=2000$, $P_{VSC1}$ reaches a maximum value of 200 MW, at $P_4=700$, $P_3=1000$, $P_2=-1300$, $P_{VSC2}$ reaches a maximum value of 162 MW, at $P_4=700$, $P_3=-1000$, $P_2=-1300$, $P_{VSC3}$ reaches a maximum value of 111.125 MW, at $P_4=700$, $P_3=1000$, $P_2=300$, $P_{VC4}$ reaches a maximum value of 668.75 MW. As such, rated power of the first converter 1 and the seventh converter 7 can be designed to 200 MW, rated power of the second converter 2 and the sixth converter 6 can be designed to 162 MW, rated power of the third converter 3 and the fifth converter 5 can be designed to 111.125 MW, and rated power of the fourth converter 4 can be designed to 668.75 MW. Overall capacity of the embodiment is 200*2+162*2+111.125*2+668.75=1615 MW. Rated DC voltages and rated capacity of all converters of this embodiment are listed in the following Table 2:

TABLE 1

Absolute values of rated DC voltages and rated DC power of all DC systems

| $E_4$ | $E_3$ | $E_2$ | $E_1$ |
|---|---|---|---|
| ±250 | ±320 | ±400 | ±500 |
| $P_{4max}$ | $P_{3max}$ | $P_{2max}$ | $P_{1max}$ |
| 700 | 1000 | 1300 | 2000 |

TABLE 2

Rated DC voltages and rated power of all converters

| Converter number | Rated DC voltage (kV) | Rated power(MW) |
|---|---|---|
| First converter | 100 | 200 |
| Second converter | 80 | 162 |
| Third converter | 70 | 111.125 |
| Fourth converter | 500 | 668.75 |
| Fifth converter | 70 | 111.125 |
| Sixth converter | 80 | 162 |
| Seventh converter | 100 | 200 |
| Overall capacity of the invention | / | 1615 |
| Overall capacity of the prior art | / | 5000 |

Figure 4:
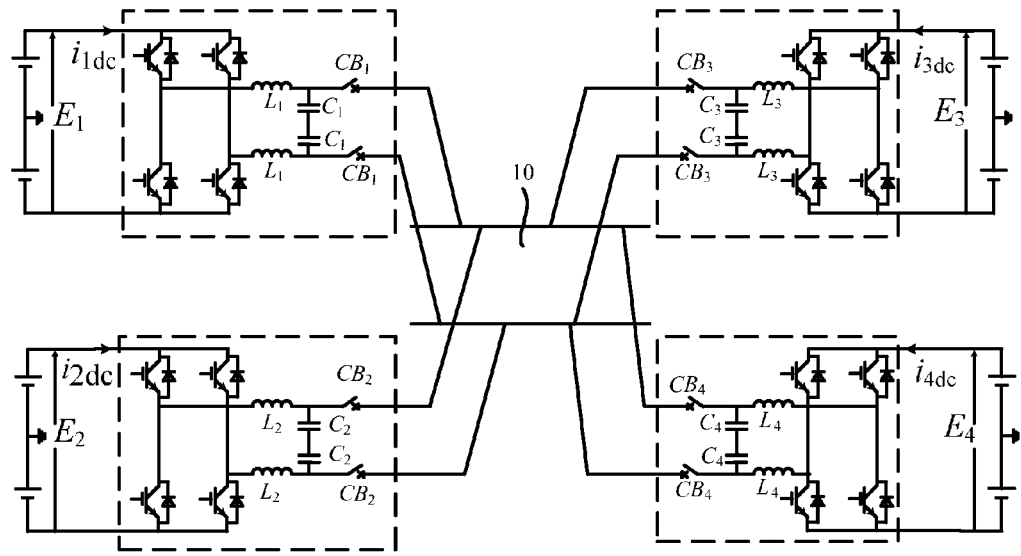
FIG. 4 is a schematic diagram of a multiport DC-DC converter employing a LCL circuit in the prior art.
Figure 5:
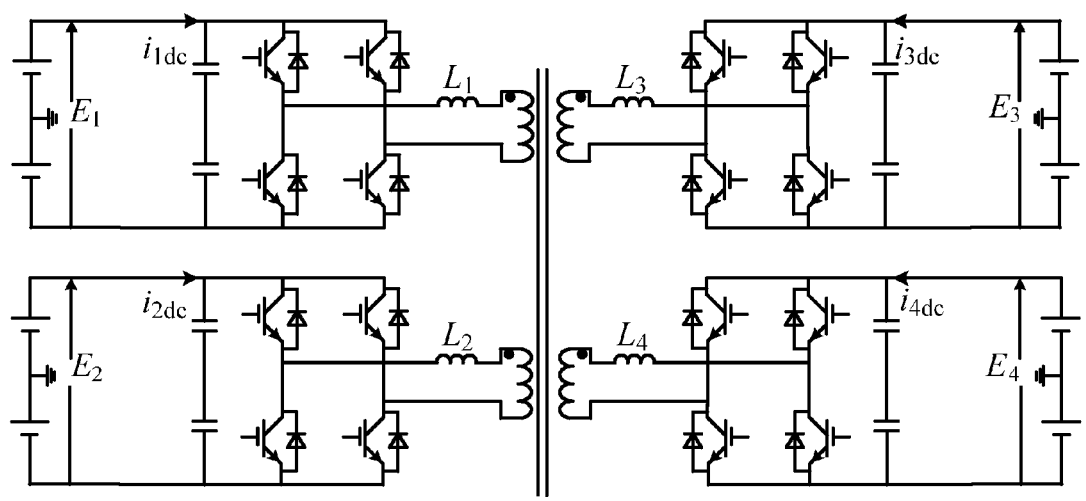
FIG. 5 is a schematic diagram of a DC-DC converter employing a multiport high-frequency transformer in the prior art.

To compare the multiport DC-DC autotransformer of the present invention with a conventional multiport DC-DC converter, FIG. 4 illustrates a multiport DC-DC converter employing a LCL circuit that is raised by Dragan Jovcic, et al in MULTIPORT HIGH POWER LCL DC HUB FOR USE IN DC TRANSMISSION GRIDS (IEEE Transactions on Power Delivery, 2014). FIG. 5 illustrates a multiport DC-DC converter employing a multiport high-frequency transformer raised by Sixifo Falcones, et al in A DC-DC MULTIPORT-CONVERTER BASED SOLID-STATE TRANSFORMER INTEGRATING DISTRIBUTED GENERATION AND STORAGE (IEEE Transactions on Power Electronics, 2013, 28(5), 2192-2203). However, all interconnection power in schemes of FIGS. 4 and 5 require DC-AC-DC conversion. In details, for the above-mentioned four-port DC-DC autotransformer, if a scheme in FIG. 4 or FIG. 5 is used, required overall capacity of all converters is 700+1000+1300+2000=5000 MW, which is far higher than that of the invention (1615 MW), namely overall capacity of all converters of the invention is 32.3% of the prior art. According to the information disclosed by the Conseil International des Grands Réseaux Electriques (CIGRE), capital investment per 1000 MW of converter is 110 million euro (as for cost estimation, see Mohsen Taherbaneh, et al, DC FAULT PERFORMANCE AND COST ANALYSIS OF DC GRIDS FOR CONNECTING MULTIPLE OFFSHORE WIND FARMS (2013 IEEE Grenoble PowerTech, 1-6)), taking a four-port DC-DC converter of 5000 MW as an example, cost of converters is 550 million euro if a conventional technology is used, and the cost is only 178 million euro if the four-port DC-DC autotransformer is used, which saves up to 372 million euro.

Figure 6:
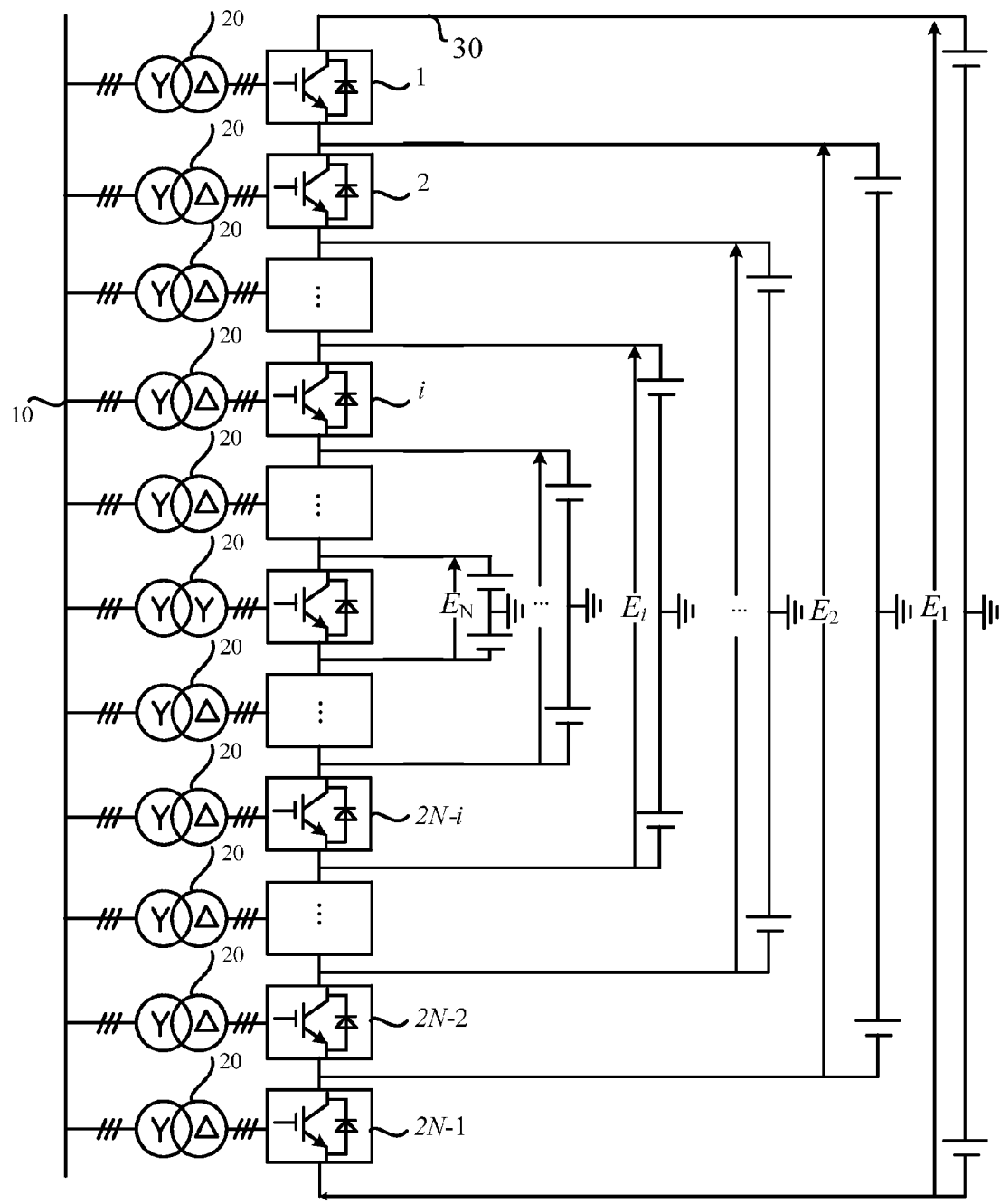
FIG. 6 is a schematic diagram of an N-port DC-DC autotransformer of still another exemplary embodiment of the invention.

FIG. 6 illustrates topology of an N-port DC-DC autotransformer. The N-port DC-DC autotransformer comprises 2N−1 converters sequentially connected in series at a DC side, and connected in parallel to one point at an AC side, a negative terminal of the first converter is connected to a positive terminal of the second converter, a negative terminal of the second converter is connected to a positive terminal of the third converter, . . . , a positive terminal of the $j^{th}$ converter is connected to a negative terminal of the $(j−1)^{th}$ converter, a negative terminal of the $j^{th}$ converter is connected to a positive terminal of the $(j+1)^{th}$ converter, and a positive terminal of the $(2N−1)^{th}$ converter is connected to a negative terminal of the $(2N−2)^{th}$ converter, j is a positive integer between 2 and 2N−2. After DC sides of all converters are connected in series, a positive terminal of the first converter and a negative terminal of the $(2N−1)^{th}$ converter are respectively connected to a positive terminal and a negative terminal of the first DC system, the positive terminal of the second converter and a negative terminal of the $(2N−2)^{th}$ converter are respectively connected to a positive terminal and a negative terminal of the second DC system, . . . , a positive terminal of the $i^{th}$ converter and a negative terminal of the $(2N−i)^{th}$ converter are respectively connected to a positive terminal and a negative terminal of the $i^{th}$ DC system, and a positive terminal and a negative terminal of the $N^{th}$ converter are respectively connected to a positive terminal and a negative terminal of the $N^{th}$ DC system. After the DC sides of all converters are connected to corresponding DC systems, the AC sides of all converters are connected to a common point being a common AC bus via an AC link.

To ensure stable operation of the multiport DC-DC autotransformer, a feasible control strategy is to use one or more converters to control the AC voltage of the common AC bus, and the other converters to control active power transferred by DC systems connected thereto.

Figure 7:
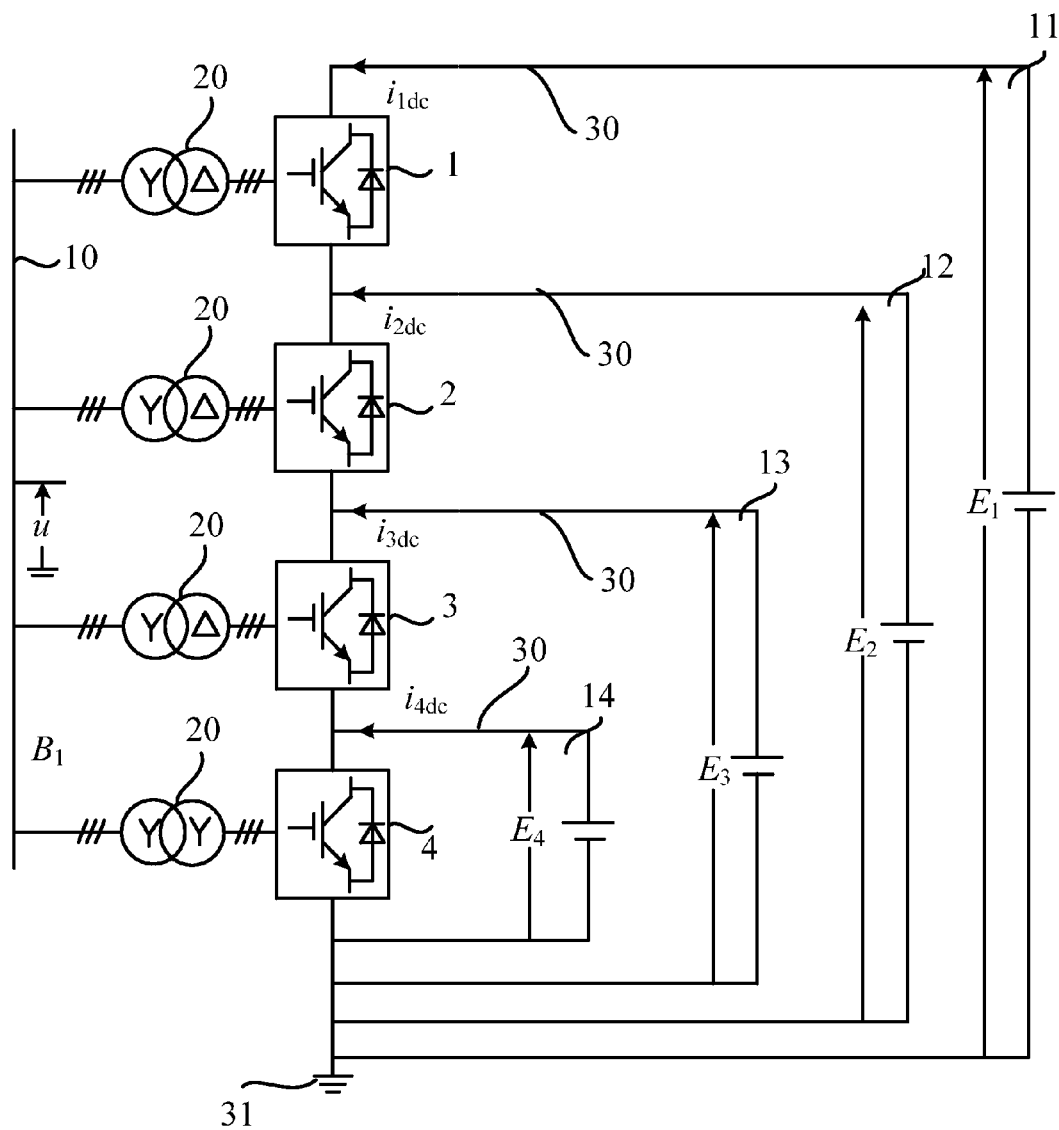
FIG. 7 is a schematic diagram of a four-port DC-DC autotransformer in which a DC system employs asymmetrical monopole topology.

FIG. 7 illustrates a four-port DC-DC autotransformer connected to four asymmetrical monopole DC systems and comprising four converters. A negative terminal of a first converter 1 is connected to a positive terminal of a second converter 2, a negative terminal of the second converter 2 is connected to a positive terminal of a third converter 3, a negative terminal of the third converter 3 is connected to a positive terminal of a fourth converter 4, a positive terminal of the first converter 1 is connected to a positive terminal of a first DC system 11 via a DC transmission line 30, a positive terminal of the second converter 2 is connected to a positive terminal of a second DC system 12 via the DC transmission line 30, a positive terminal of the third converter 3 is connected to a positive terminal of a third DC system 13 via the DC transmission line 30, a positive terminal of the fourth converter 4 is connected to a positive terminal of a fourth DC system 14 via the DC transmission line 30, and the negative terminals of the first DC system 11 to the fourth DC system 14 are connected to a negative terminal of the fourth converter 4 via a respective DC transmission line 30, and further to the ground 31. The DC transmission line 30 may comprise a transmission line, a cable, a DC inductor and so on that are well-known in the art.

Figure 8:
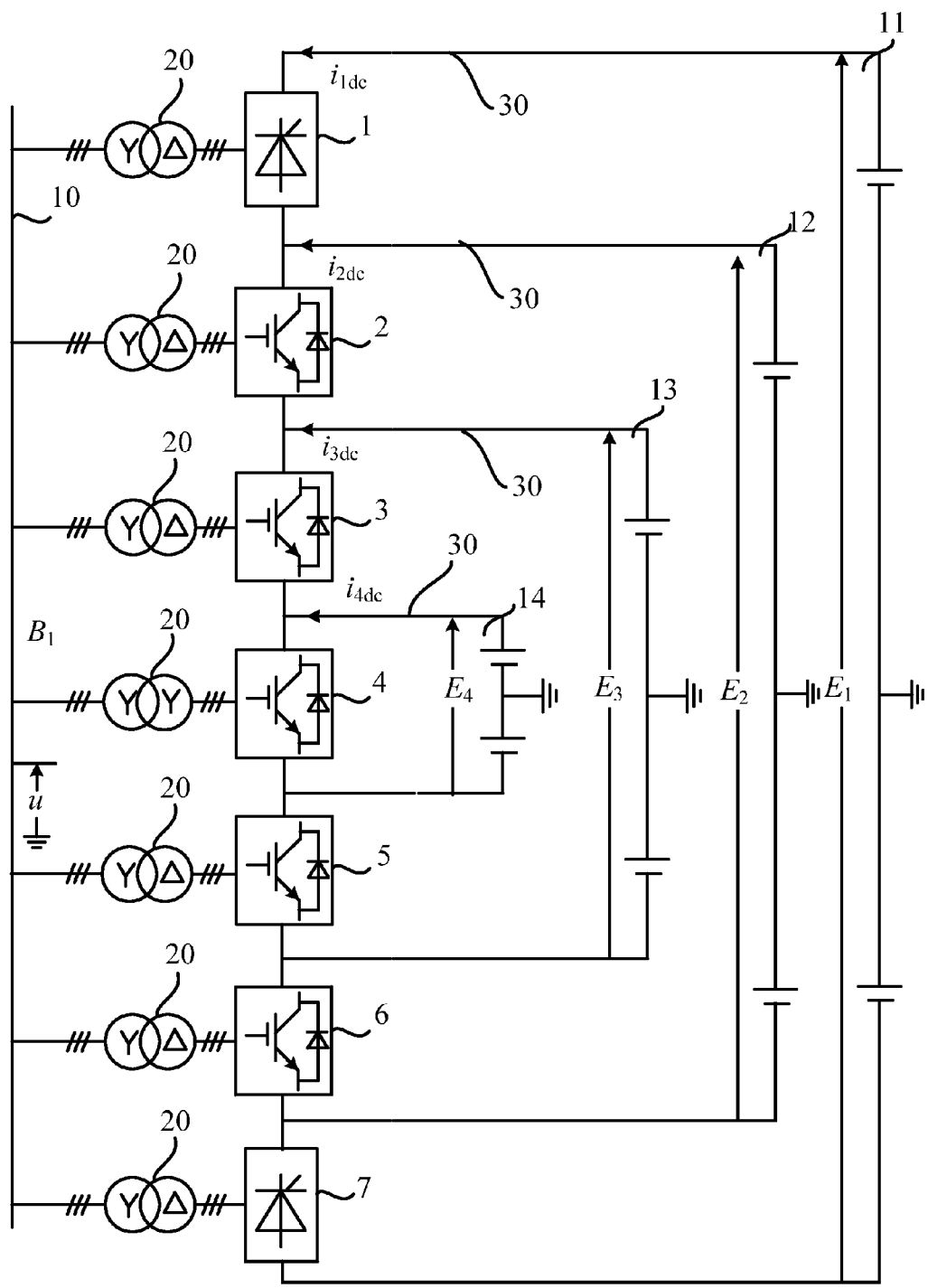
FIG. 8 is a schematic diagram of the invention in which some converters employ thyristor based line commutated converters.

FIG. 8 is another embodiment of the four-port DC-DC autotransformer in which a first converter 1 and a seventh converter 7 employ line commutated converters and the line commutated converters operate at a rectifying mode. This embodiment is similar to the embodiment of FIG. 2, except that the first DC system 1 and the DC-DC autotransformer can only transfer power in a single direction due to the fact that the first converter 1 and the seventh converter 7 employ line commutated converters so that the first DC system 1 can only absorb DC power from the DC-DC autotransformer.

Figure 9:
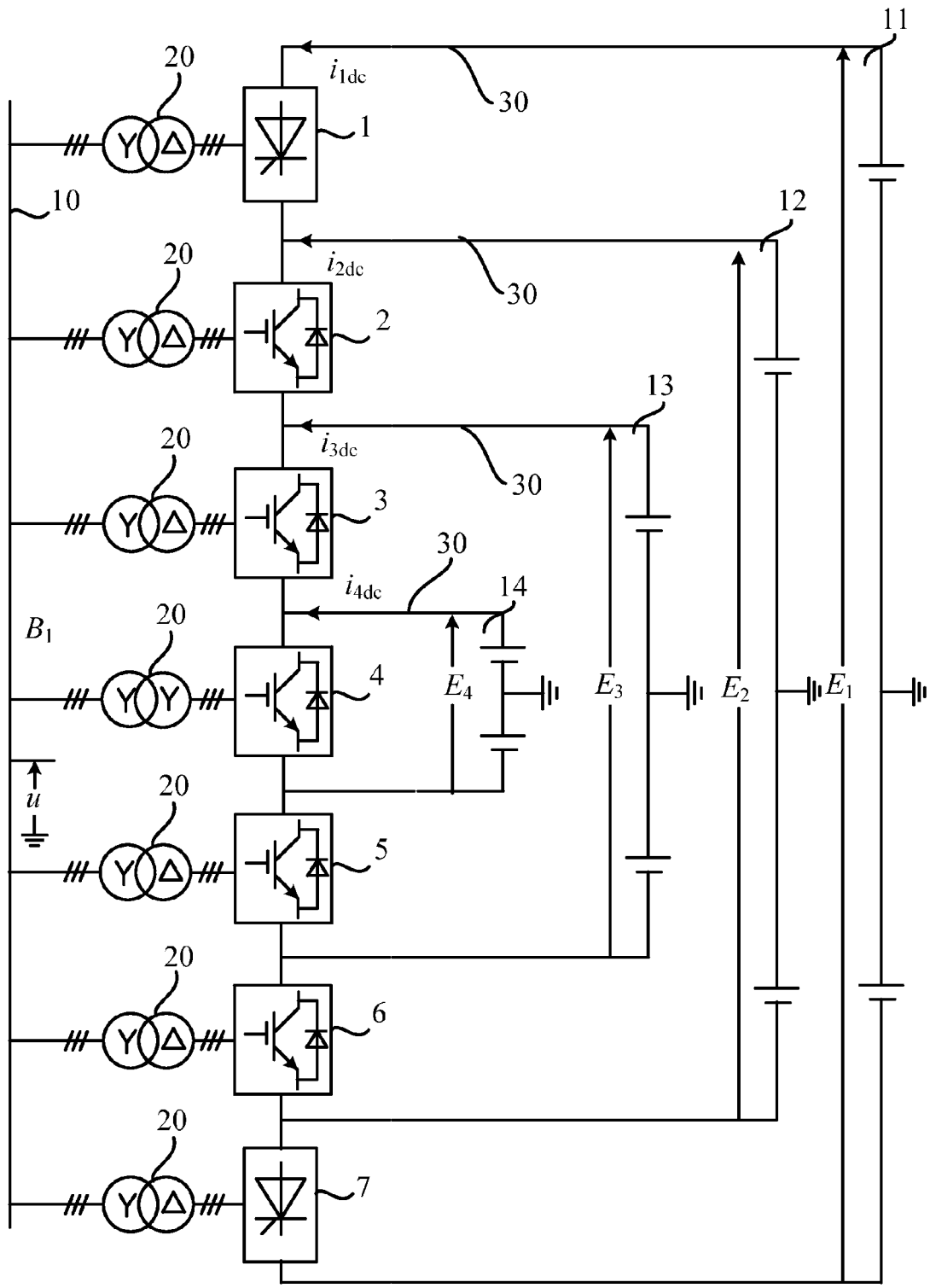
FIG. 9 is another schematic diagram of the invention in which some converters employ thyristor based line commutated converters.

FIG. 9 is still another embodiment of the four-port DC-DC autotransformer in which a first converter 1 and a seventh converter 7 employ line commutated converters and the line commutated converters operate at an inverter mode. This embodiment is similar to the embodiment of FIG. 2, except that the first DC system 1 and the DC-DC autotransformer can only transfer power in a single direction due to the fact that the first converter 1 and the seventh converter 7 employ the line commutated converters so that the first DC system 1 can only output DC power to the DC-DC autotransformer.

Figure 10:
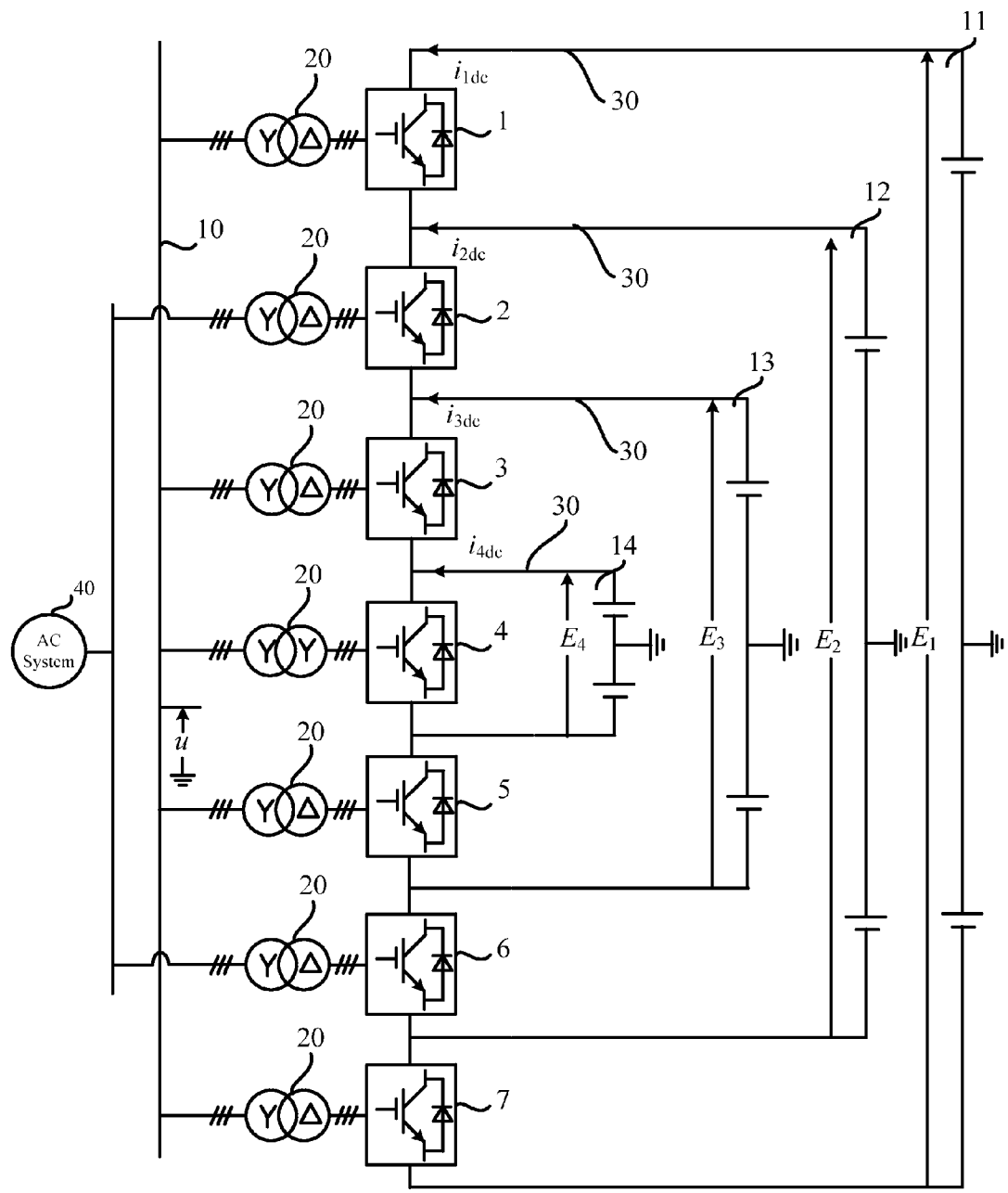
FIG. 10 is a schematic diagram of the invention in which AC sides of some converters are connected to an external AC system.

In this application, AC terminals of all converters are not necessarily connected to a common point. FIG. 10 illustrates a further embodiment in which AC sides of some converters are not connected to a common AC bus, but to other AC systems. This embodiment is similar to the embodiment of FIG. 2, except that AC sides of the second converter 2 and the sixth converter 6 are not connected to the common AC bus 10, but to an AC system 40. In practice, AC sides of one or more converters may be connected to one or more external AC systems 40.

Figure 11:
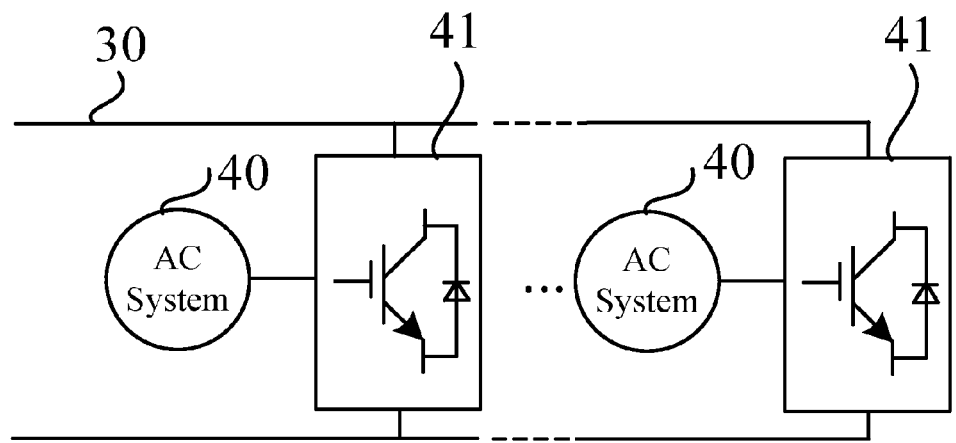
FIG. 11 is a schematic diagram of a DC system of a further exemplary embodiment of the invention.

FIG. 11 illustrates an embodiment of a DC system of the invention, multiple AC systems 40 are connected in parallel at a DC side via a DC transmission line 30 after AC-DC conversion by a converter 41.

Figure 12:
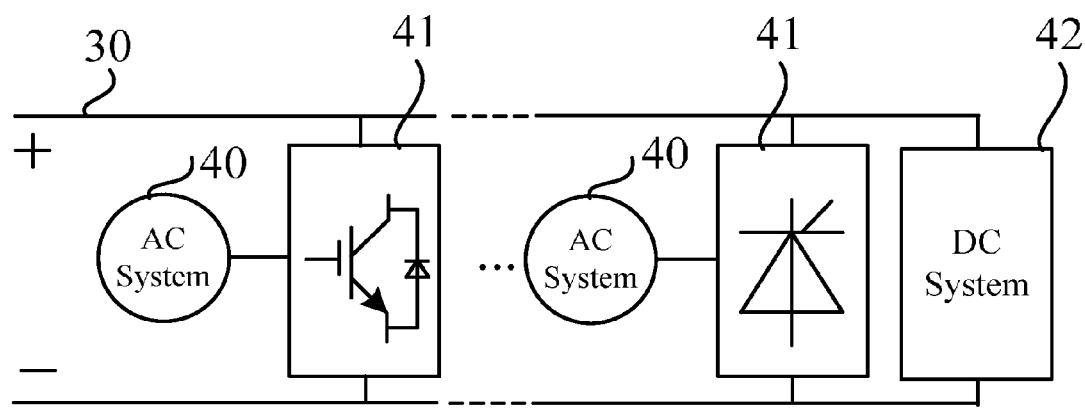
FIG. 12 is a schematic diagram of another DC system of a still further exemplary embodiment of the invention.

FIG. 12 illustrates another embodiment of a DC system of the invention, multiple AC systems 40 are connected to a DC system 42 outputting DC current in parallel at a DC side via a DC transmission line 30 after AC-DC conversion by a converter 41.

Figure 13:
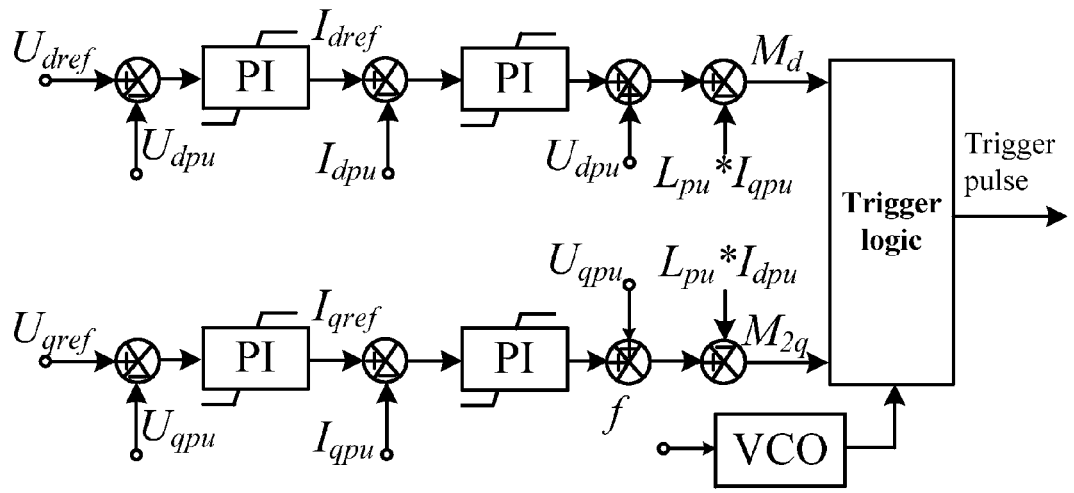
FIG. 13 illustrates a principle for controlling an AC voltage.

FIG. 13 illustrates voltage control of the common AC bus, in which $U_{dref}$ and $U_{qref}$ are dq axis instruction values of a bus voltage (per unit), $U_{dpu}$ and $U_{qpu}$ are measured values of dq axis voltages, $I_{dref}$ and $I_{qref}$ are dq axis current instruction values (a current output direction is specified as a positive direction of current), $L_{pu}$ is a per unit value of an AC link's inductance, $M_d$ and $M_q$ are dq axis modulation ratios, VCO is a voltage-controlled crystal oscillator, and operates to provide reference angles for triggering and controlling converters, and f is an operation frequency of the AC link.

Figure 14:
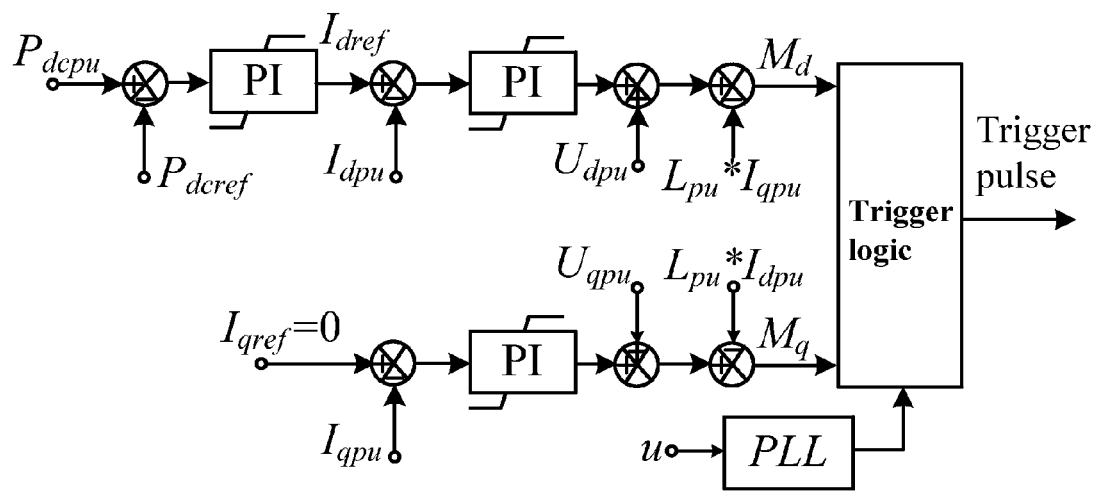
FIG. 14 illustrates a principle for controlling a DC power.

FIG. 14 illustrates control of DC active power, in which $P_{dcpu}$ is a per unit value of DC power, $P_{dcref}$ is a reference value of DC power, u is an instantaneous voltage of a common AC bus, and PLL is a phase-locked loop.

Figure 15:
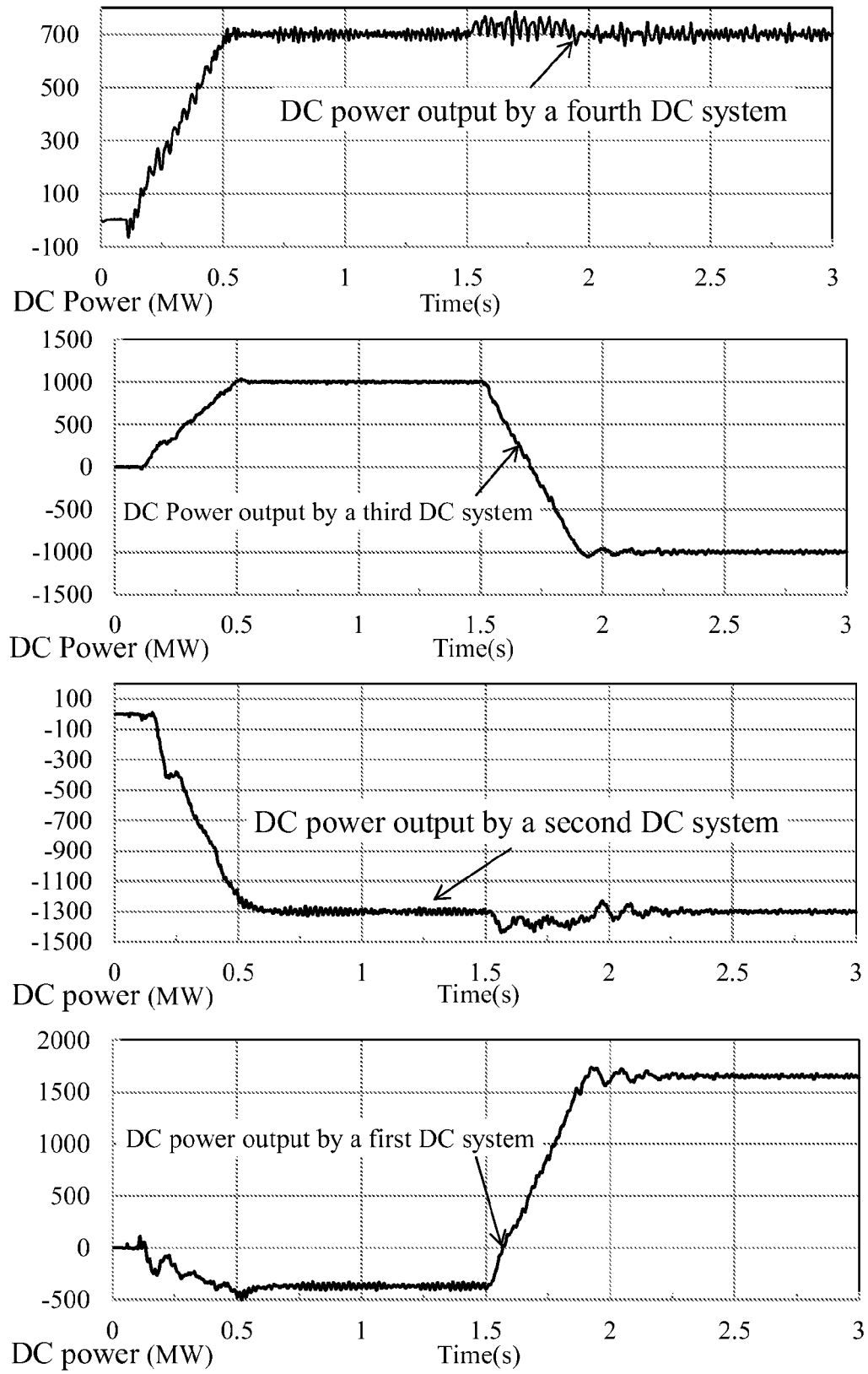
FIG. 15 is a simulation curve of DC power output by DC systems of the four-port DC-DC autotransformer.
Figure 16:
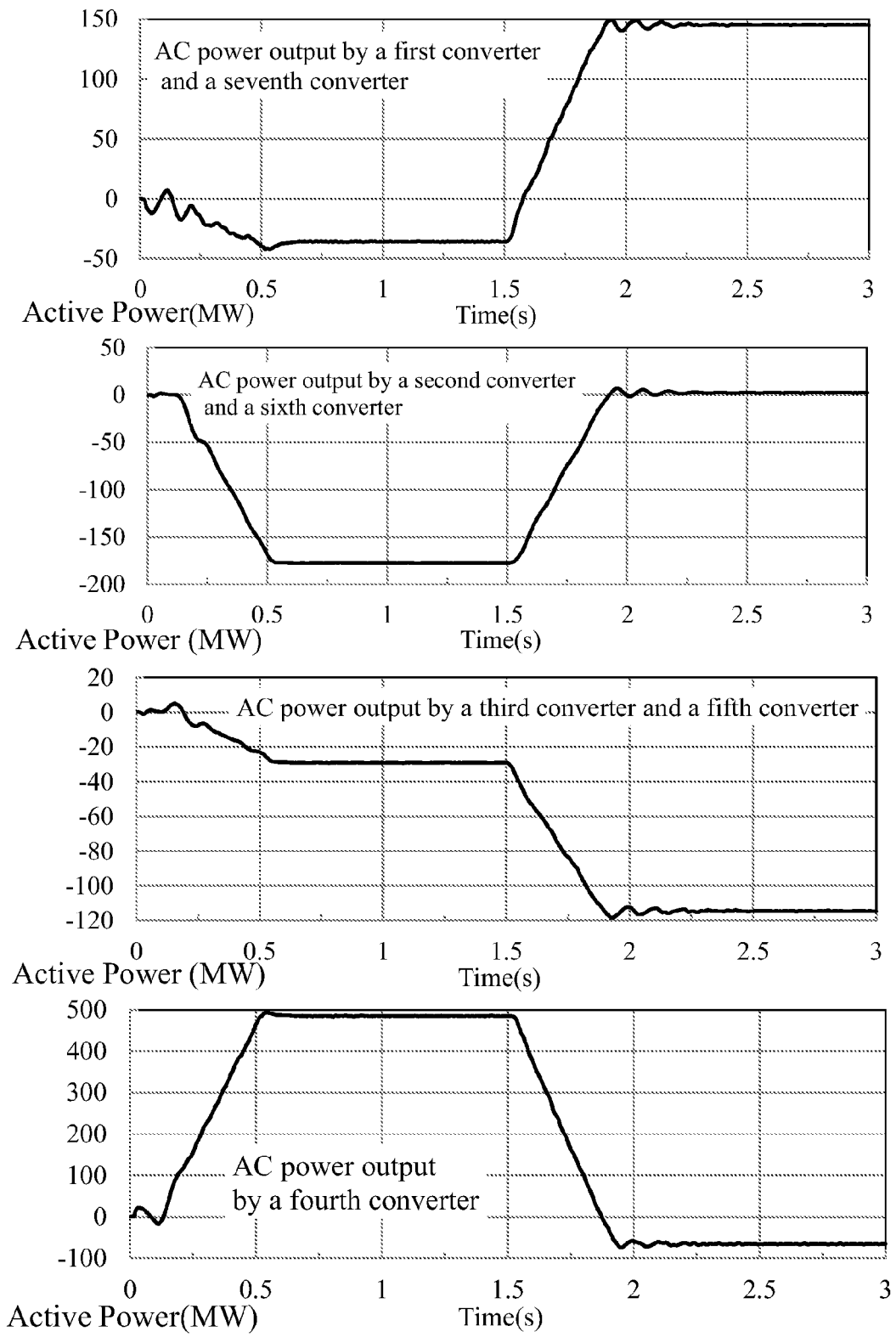
FIG. 16 is a simulation curve of AC power output by converters of the four-port DC-DC autotransformer.
Figure 17:
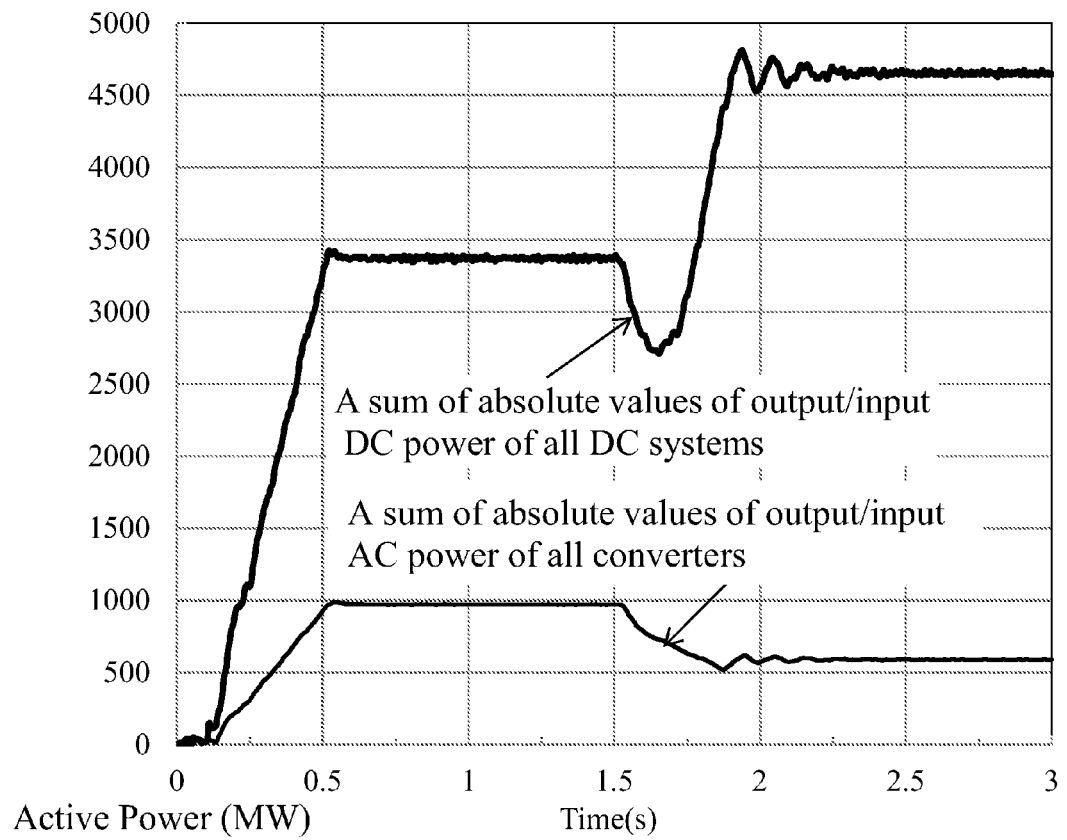
FIG. 17 is a simulation curve of a sum of absolute values of DC power output by DC systems of the four-port DC-DC autotransformer, and a sum of absolute values of AC power output by converters thereof.

To test technical feasibility of the present invention, electromagnetic transient simulation software PSCAD/ETMDC that is commonly-used in the world is used for simulation of a four-port DC-DC autotransformer of the invention, in which rated voltages and rated DC power of all DC systems are listed in above Table 1, rated voltages and rated power of all converters are listed in above Table 2, and FIGS. 15 to 17 illustrate corresponding simulation results. In FIG. 15, active power output by DC systems from the fourth to the first is illustrated from the top to the bottom. From 0.1 s to 0.5 s, instruction values of DC power output from the DC systems from the fourth to the second increases from 0 to 700 MW, 1000 MW, and −1300 MW, respectively. The first DC system operates to balance active power of the whole multiport DC-DC autotransformer. It can be seen from FIG. 15 that active power output from each DC system can reach a predetermined instruction value in a controllable manner. From 1.5 s to 1.9 s, an instruction value of DC power output from the third DC system decreases from 1000 MW to −1000 MW, while instruction value of DC power output from the fourth DC system and the second DC system are constant. It can be seen from a curve after 1.5 s in FIG. 15 that DC power output from the third DC system is reduced to −1000 MW in a controllable manner (namely the third DC system changes from outputting 1000 MW DC power into absorbing 1000 MW DC power from the DC-DC autotransformer), and active power output from the fourth DC system and the second DC system slightly fluctuates, but almost keeps constant in the vicinity of the instruction value thereof. To balance DC power of the whole multiport DC-DC autotransformer, DC power output by the first DC system after 1.5 s changes from approximately −370 MW to approximately 1650 MW.

FIG. 16 illustrates AC power outputting from converters from the first to the seventh. Since in this embodiment, DC systems from the fourth to the first are symmetrical bipolar DC systems, AC power output from the first converter is the same as that from the seventh converter, AC power output from the second converter is the same as that from the sixth converter, and AC power output from the third converter is the same as that from the fifth converter. When the DC power outputting from the DC systems from the fourth to the second is respectively 700 MW, 1000 MW, and −1300 MW, according to equations (31) to (38), theoretical values of AC power of converters from the first to the fourth are respectively −40 MW, −162 MW, −32.375 MW and 468.75 MW. AC power output by converters between 0.5 s to 1.5 s in FIG. 16 is corresponding to the above-mentioned theoretical values.

FIG. 17 illustrates a sum of absolute values of output/input DC power of all DC systems and a sum of output/input AC power of all converters, and the sum of power of all converters is far less than that of DC power that is actually transferred. The invention is capable of significantly reducing power rating of converters and AC links, and thus investment cost, and greatly reducing operation loss and thus operation cost since only small part of interconnection power needs two-stage DC-AC-DC conversion.

Preferably, the converters from the first to the $(2N-1)^{th}$ employ voltage source converters to enable bidirectional power exchange. The voltage source converter is well-known in the art, and may be a two-level converter, a three-level converter, a modular multi-level converter and so on.

Compared with conventional multiport DC-DC converters, the DC-DC converter disclosed in this invention for interconnecting DC systems having different rated DC voltages has the following advantages:

(1) required power rating of all converters is 30% of a sum of absolute values of input/output DC power of all interconnected DC systems, while for the conventional multiport DC-DC converter, required overall power rating of all converters is 100% of a sum of absolute values of input/output DC power of all interconnected DC systems, therefore, compared to the conventional converter, the invention saves cost of converters by approximately 70%.

(2) according to data provided by the Conseil International des Grands Réseaux Electriques (CIGRE), capital investment per 1 GW of converter is 110 million euro, taking a four-port DC-DC converter of 5 GW as an example, the invention is able to save cost of 385 million euro. In China and over the world, power rating of DC systems that need to be interconnected might be up to hundreds of GW in the future, and economic benefits of the present invention compared with the conventional multiport DC-DC converter is obvious.

(3) since the overall power rating of all converters of the invention is less than that of all converters in the conventional DC-DC converter, the invention can save power rating of AC transformers, phase reactors and so on that are used.

(4) since most active power is transferred via direct electric connection between interconnected DC systems, only 30% interconnection power requires two-stage DC-AC-DC conversion, while for a conventional multiport DC-DC converter, all interchanged power needs two-stage DC-AC-DC conversion, so the invention can significantly reduce operation loss and thus operation cost.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A multiport DC-DC autotransformer for interconnecting three or more DC systems, the autotransformer comprising:
   2N−1 converters sequentially connected in series at a DC side, each of the 2N−1 converters having an AC link connected to an AC line at an AC side of the 2N−1 converters;
   wherein a positive terminal of an $i^{th}$ converter of the 2N−1 converters sequentially connected in series and a negative terminal of a $(2N-i)^{th}$ converter are respectively connected to a positive terminal of an $i^{th}$ DC system and a negative terminal thereof; and
   wherein N represents a number of DC systems, N≥3, and i is a natural number no greater than N.

2. The autotransformer of claim 1, wherein at least one converter of the 2N−1 converters operates to control an AC voltage of the AC line, and the remaining converters operate to control respective active power, thereby facilitating stable operation of the autotransformer.

3. The autotransformer of claim 1, wherein one or more converters of the 2N−1 converters are connected to the AC line via phase reactors, and each phase of the phase reactors employ delta connection thereby eliminating neutral unbalance of the converters.

4. The autotransformer of claim 1, wherein any one of the three or more DC systems is formed by one or more AC systems that are interconnected at the DC side after AC-DC conversion, or by one or more AC systems that are connected to DC systems outputting DC power at the DC side after AC-DC conversion.

5. The autotransformer of claim 1, wherein part or all of the AC line is connected to one or more external AC grids.

6. The autotransformer of claim 1, wherein the AC line is a common AC bus, and the AC side of each converter is connected to the common AC bus via the AC link.

7. The autotransformer of claim 1, wherein the AC line comprises a common AC bus and an external AC system, AC sides of some converters are connected to the common AC bus, and AC sides of other converters are connected to the external AC system so that all converters can be connected to a same AC grid or different AC grids.

8. The autotransformer of claim 1, wherein each of the 2N−1 converters employs symmetrical bipolar topology, symmetrical monopole topology, asymmetrical monopole topology or asymmetrical bipolar topology.

9. The autotransformer claim 1, wherein each of the 2N−1 converters is a voltage source converter operating to enable bidirectional power exchange between any DC system and the autotransformer, or a thyristor based line commutated converter, or a un-controlled rectifying bridge.

10. The autotransformer claim 1, wherein the AC link employs a single-phase, a two-phase, a three-phase or a multi-phase AC circuit.

11. The autotransformer claim 1, wherein a rated DC voltage of each of the $i^{th}$ converter and the $(2N-i)^{th}$ converter is $(E_i-E_{i+1})/2$, and a rated DC voltage of the $N^{th}$ converter is $E_N$, where $E_i$, $E_{i+1}$ and $E_N$ respectively represents a rated DC voltage of the $i^{th}$, the $(i+1)^{th}$ and the $N^{th}$ DC system.

12. A method for controlling the multiport DC-DC autotransformer of claim 1, the method employing at least one converter to control an AC voltage of the AC line, and the other converters operate to control parameters related to active power.

13. The method of claim 12, wherein the parameters relating to active power comprise a DC power and/or a DC voltage.

14. A multiport DC-DC autotransformer for interconnecting three or more DC systems, the autotransformer comprising:
   2N−1 converters sequentially connected in series at a DC side, and connected to an AC line via an AC link at an AC side;
   wherein a positive terminal of an $i^{th}$ converter of the 2N−1 converters sequentially connected in series and a negative terminal of a $(2N-i)^{th}$ converter are respectively connected to a positive terminal of an $i^{th}$ DC system and a negative terminal thereof;
   wherein N represents a number of DC systems, N≥3, and i is a natural number no greater than N;
   2N−2 converters other than an $N^{th}$ converter of the 2N−1 converters sequentially connected in series are connected to the AC line via 2N−2 AC transformers; and
   ports of the 2N−2 AC transformers in a vicinity of the DC side employ delta connection thereby eliminating neutral unbalance of the 2N−2 converters.

15. The autotransformer of claim 14, wherein ports of the 2N−2 AC transformers of 2N−2 converters other than the $N^{th}$ converter of the 2N−1 converters sequentially connected in series in the vicinity of the AC line employ star connection thereby eliminating neutral unbalance of the 2N−1 converters other than the $N^{th}$ converter.

16. A method for determining power rating of each converter of a multiport DC-DC autotransformer for interconnecting three or more DC systems, the autotransformer comprising 2N−1 converters sequentially connected in series at a DC side, and connected to an AC line via an AC link at an AC side; wherein a positive terminal of the $i^{th}$ converter of the 2N−1 converters sequentially connected in series and a negative terminal of the $(2N-i)^{th}$ converter are respectively connected to a positive terminal of an $i^{th}$ DC system and a negative terminal thereof; N represents a number of DC systems, N≥3 and i is a natural number no greater than N; the method comprising:

(1) determining a DC current $i_{vsci}$ flowing from the $i^{th}$ converter:

$$i_{VSCi} = \frac{P_2 + \ldots + P_N}{E_1} - \frac{P_2}{E_2} - \frac{P_3}{E_3} - \ldots - \frac{P_i}{E_i} \qquad 5$$

where $P_i$ represents power output to the autotransformer by the $i^{th}$ DC system, and $E_i$ represents a rated DC voltage of the $i^{th}$ DC system;

(2) determining rectifying power $P_{vsc}$ of the $i^{th}$ converter:

$$P_{VSCi} = \left(\frac{P_2 + \ldots + P_N}{E_1} - \frac{P_2}{E_2} - \ldots - \frac{P_i}{E_i}\right) * \frac{E_i - E_{i+1}}{2} \qquad 15$$

where $-P_{imax} \leq P_i \leq P_{imax}$ $-P_{1max} \leq (P_2 + P_3 + \ldots + P_N) \leq P_{1max}$ wherein $P_{imax}$ represents maximum output/input power of the $i^{th}$ DC system, $P_{1max}$ represents maximum output/input power of a first DC system, and $E_i$ represents a rated DC voltage of the $i^{th}$ DC system; and (3) obtaining maximum power of each converter as rated power thereof according to the DC current and the rectifying power.

17. The method of claim 16, wherein rated power of a converter of the 2N−1 converters is equal to that of another converter symmetric thereto in a serial connection link.

* * * * *